Aug. 15, 1961 S. J. GOSTIN 2,996,345
COMBINATION TABLE
Filed Oct. 21, 1958 3 Sheets-Sheet 1

Sommers J. Gostin
INVENTOR.

BY *Clarence A. O'Brien*
*and Harvey B. Jacobson*
Attorneys

Aug. 15, 1961  S. J. GOSTIN  2,996,345
COMBINATION TABLE
Filed Oct. 21, 1958  3 Sheets-Sheet 2
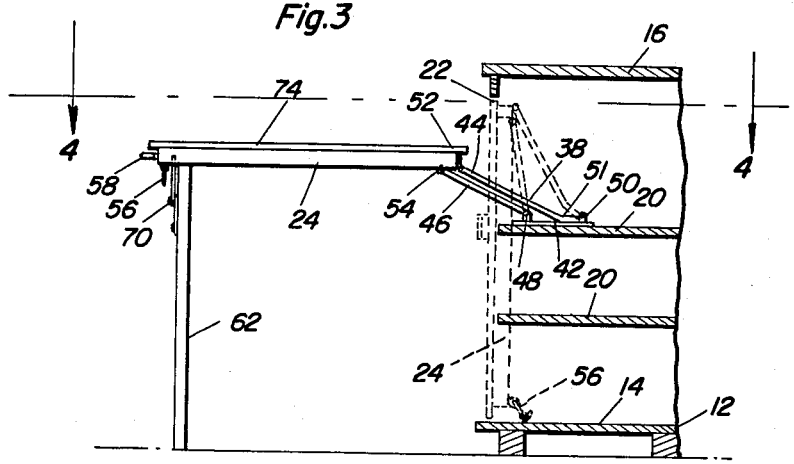
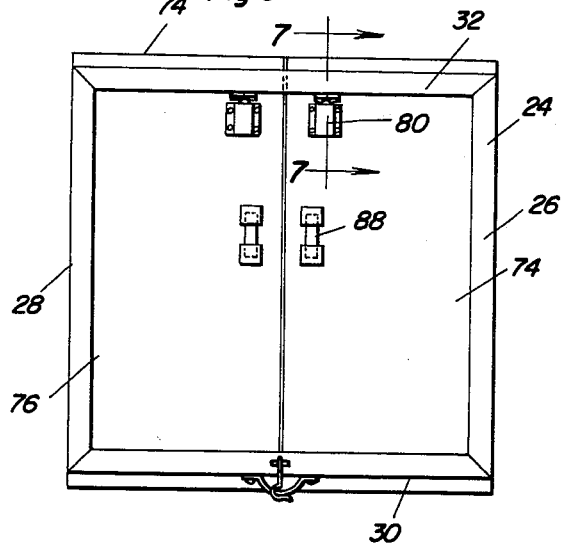
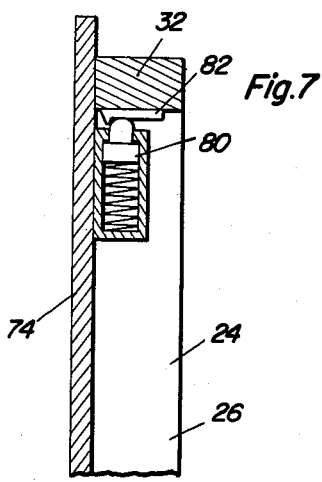
Sommers J. Gostin
INVENTOR.
BY *Clarence A. O'Brien*
*and Harvey B. Jacobson*
Attorneys Aug. 15, 1961 S. J. GOSTIN 2,996,345
COMBINATION TABLE
Filed Oct. 21, 1958 3 Sheets-Sheet 3
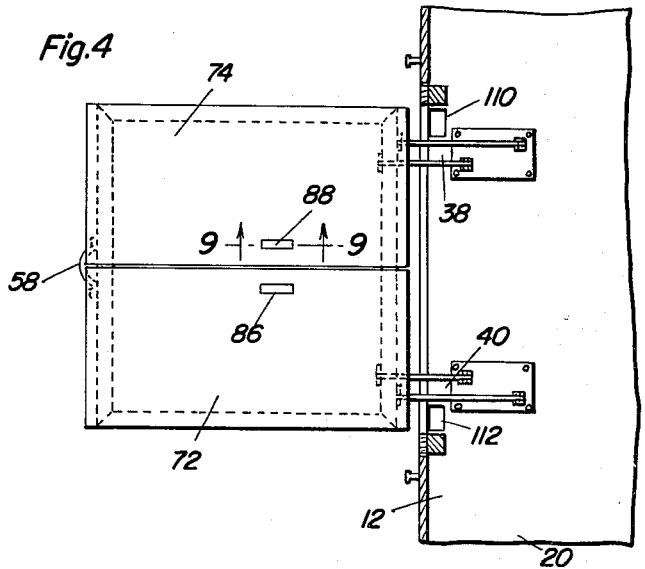
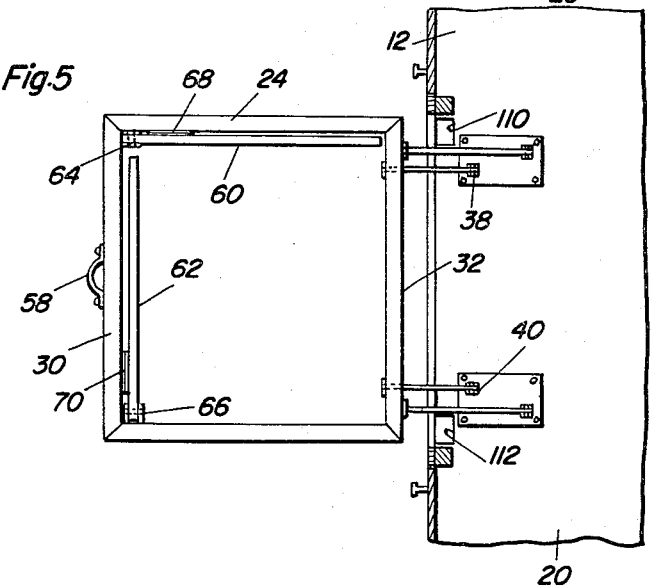
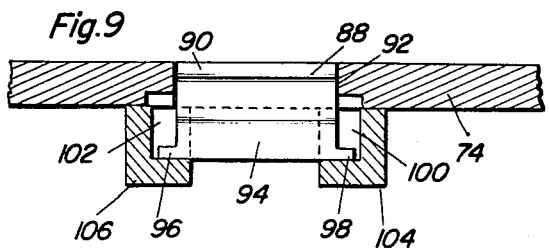
Sommers J. Gostin
INVENTOR.

ately claimed, reference being had to the accom-

United States Patent Office 2,996,345
Patented Aug. 15, 1961

2,996,345
COMBINATION TABLE
Sommers J. Gostin, 1290 Wesleyan Drive, Macon, Ga.
Filed Oct. 21, 1958, Ser. No. 768,774
4 Claims. (Cl. 312—241)

The invention relates to a combination cabinet and table.

The combination table and cabinet constructed in accordance with the invention is capable of being used in many places. However one principal application of the invention is in the kitchen where the cabinet is a kitchen cabinet and the table is a breakfast table capable of being used as such and as a work table for the convenience of the housewife.

An object of the invention is to provide a combination cabinet and table to furnish storage space and a cabinet top work area. A further object of the invention subtended from the previous object is to provide within the same unit a breakfast table.

The invention was designed for a kitchen with limited available space and where no other dining area is present. It provides a very sturdy and convenient table that seats three people very comfortably, and four people may sit around the table with very little crowding and inconvenience. Clean dishes may be kept handy inside the cabinet and the top of the cabinet provides space on which to place the serving dishes within easy reach thereby leaving the table free for only those items that are necessary for eating.

When desired, the table may be folded down and the top of the table then automatically becomes one or more, preferably two, doors which may operate as normal cabinet doors providing access to the storage area of the cabinet. This, at the same time, increases the floor space available in the kitchen, all with a minimum of effort and no additional furniture to be moved around.

One of the features of the invention is a multi-sided frame connected by hinge arms to the cabinet base, preferably a shelf thereof, together with legs on the frame. A pair of doors are hinged to the frame, and the entire assembly including legs, doors and frame is swingable from a substantially vertical position at which the entire assembly covers the frontal opening of the cabinet, to a horizontal position at which the doors automatically become a table top.

When the assembly is returned to the vertical position, the doors in the frame are capable of being used as any other ordinary cabinet doors.

Another very important feature of this invention is found in the way that the door pulls operate. The doors have apertures in them, and the handle parts of the door pulls drop into a recessed position within the apertures when the frame is moved to a horizontal position. This provides a flush surface for the table top. However, when the frame is moved to the vertical position, there are inner parts of the door pulls which contact the front edge of one of the shelves thereby pushing the door pulls outwardly of the doors through the apertures in the doors and presenting the handle part for use in swinging the doors from the closed to the opened positions.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a sectional view of the combination cabinet and table with the table in the open position that is, horizontal and capable of being used as a table.

FIGURE 4 is a horizontal sectional view taken on the line 4—4 of FIGURE 3.

FIGURE 5 is a horizontal sectional view but showing the doors removed in order to expose the legs that are foldably attached to the frame of the combination cabinet and table.

FIGURE 6 is a rear elevational view of the doors and their frame.

FIGURE 7 is an enlarged sectional view showing a door latch and taken on the line 7—7 of FIGURE 6.

FIGURE 9 is a sectional view taken on the line 9—9 of FIGURE 4 and on an enlarged scale, showing the door pull as it appears when recessed in the door whereby the door pull part of the door pull is flush with the remainder of the surface of the door.

Figure 1:
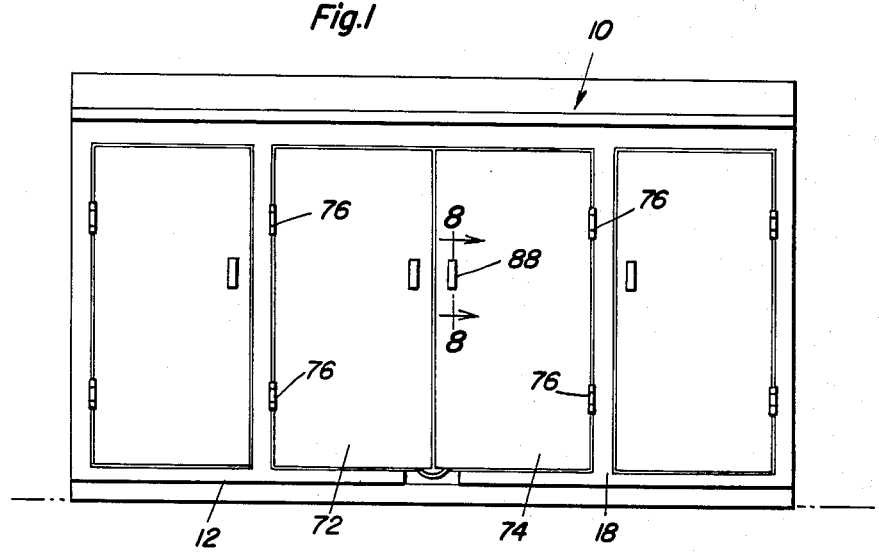
FIGURE 1 is a front view of a combination cabinet and table constructed in accordance with the invention.
Figure 2:
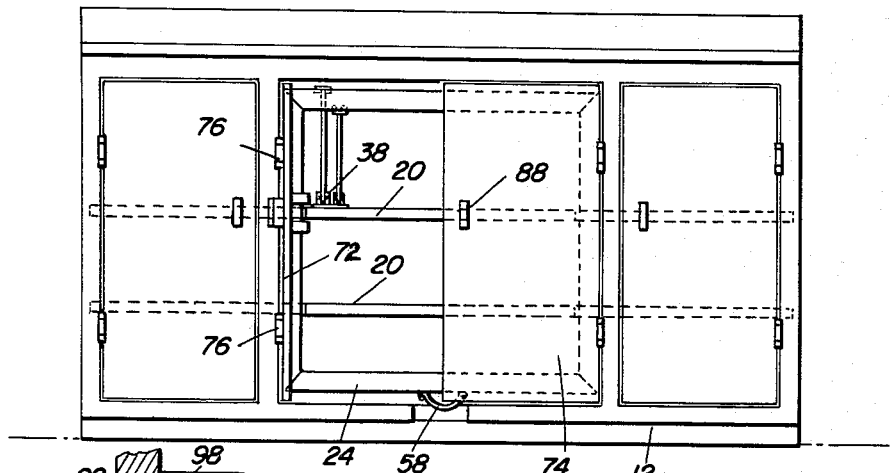
FIGURE 2 is a front view of the cabinet and table in FIGURE 1 but showing one of the doors in the open position.

In the accompanying drawings there is a combination cabinet and table 10 constructed to exemplify the principles of the invention. The cabinet is made of a cabinet structure 12 having a bottom 14, top 16, end walls, rear wall and a front frame 18. Any number of shelves 20, compartments, drawers and the like may be provided in the cabinet structure. However, in the cabinet structure there is a frontal opening 22 within which frame 24 is disposed. The frame has four sides 26, 28, 30 and 32 joined together to form either a square or a rectangle. The frame has a pair of hinges 38 and 40 mounting it for movement between a vertical position at which it fits into opening 22 to a horizontal position at which it extends outwardly from the front of the cabinet structure 12. Each hinge is identical. Hinge 38 is shown in detail (FIG. 3) and consists of a plate 42 attached to shelf 20 and provided with a pair of hinge arms 44 and 46. The hinge arms are pivoted by pivot pins 48 and 50 to upstanding ears on plate 42. The hinge arm 46 is straight and slightly shorter than hinge arm 44 located behind it. There is an angulated end 51 on hinge arm 44 which contacts the upper face of plate 42 when the table-door assembly is moved to the horizontal position (FIG. 3) thereby forming a stop to stabilize the table. The opposite ends of the hinge arms 44 and 46 are attached by hinge pins 52 and 54 to the upper side of frame 24.

When in the closed position (see dotted line position of FIG. 3) the frame occupies opening 22 and is held in place by a latch, for instance hook and eye assembly 56 attached to the bottom 14 of the cabinet structure 12 and to side 30 of the frame. Handle 58 is attached to the side 30 of frame 24 adjacent to latch 56, and is used for facilitating the lifting of the table-door assembly to the horizontal position.

There are two legs 60 and 62 on the table. Each leg is connected to frame 24 so that when open to the extended position, they are at the front edge of the table. Leg 60 is attached by hinge 64 at one corner of frame 24, and leg 62 is attached by hinge 66 at the opposite corner. Folding links 68 and 70 are connected between the frame and the two legs to assure that the legs will not inadvertently fold or collapse. These folding links 68 and 70 are the same as those commonly used on card table legs.

Figure 8:
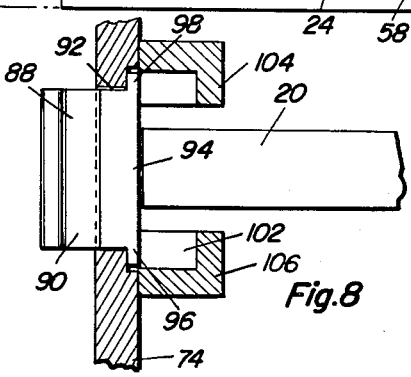
FIGURE 8 is an enlarged sectional view taken on the line 8—8 of FIGURE 1 and showing one of the door pulls in the extended position.

The two doors 72 and 74 are attached by hinges 76 at their outer edges to the sides 26 and 28 of frame 24. When in the vertical position, the doors swing about the axes of the two pairs of hinges (FIG. 1) to the open position to permit entry into the cabinet structure. Ball detent latches 80 are connected to the doors and engage latch keepers 82 on either the upper or lower side of frame 24 to hold the doors in the closed position but enable them to be pulled open. One conventional latch 80 is illustrated, although it is to be understood that any other type of conventional cabinet door latch may be used. Among the other hardware are door pulls 86 and 88. These are automatically extended (FIG. 8) when the doors are in a closed position and when the entire assembly is arranged vertically in opening 22. Each door pull, for instance typical door pull 88 has a handle part 90 disposed in aperture 92 in door 74. The outer surface of the handle part is planar and as shown in FIGURE 9, fits flush with the remainder of the surface of the door when the door is in the horizontal position. The inner part 94 of the door pull has a pair of laterally projecting ears 96 and 98 which operate in recesses 100 and 102 formed by brackets 104 and 106 attached to the inside surface of door 74. As shown in the drawings a part of the door may be mitered out should this be found desirable or necessary to enlarge the recesses 100 and 102. Therefore when door pull 88 is in the horizontal position, for instance by swinging frame 24 from the vertical to the horizontal position, the door pull will drop down until the ears 96 and 98 contact the lower walls of the recesses 100 and 102. This provides for a flush surface on the table top. But when the frame is moved to the vertical position, the inner parts 94 of the door pulls engage the front edge of shelf 20. The spacing is such that this pushes the handle parts 90 of the door pulls outwardly from the front surface of the doors so that they may be easily grasped by a person desiring to enter the cabinet structure 12.

In use the assembly of the frame and doors in the vertical position remains fastened in place by latch 56, and the doors 72 and 74 may be swung open just as in any other conventional cabinet. But, when a table is desired, the entire frame and structure connected with it is swung to a horizontal position and the legs 62 and 60 are lowered. The door pulls automatically drop so that their outer surfaces are flush with the surfaces of the doors, all cooperating to form a smooth table top. After the table has been used, it is only necessary to fold the legs 60 and 62 and return the frame 24 together with its doors 72 and 74 to the vertical position. The frame fits snug in the opening 22, and there are notches 110 and 112 in the shelves 20 to accept the frame.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a combination cabinet and table, a cabinet structure having an opening, a frame in said opening, means near the upper end of said frame hingedly securing said frame to said cabinet structure so that said frame is swingable between a vertical position occupying said opening to a horizontal position protruding laterally from the cabinet structure, a pair of doors hinged to said frame and adapted to open and close for entrance into the cabinet when the frame is in the vertical position, said doors constituting a table top when said frame is in the horizontal position, a pair of legs connected with said frame and remote from said hinge means, door pulls connected with said doors and including a hand grasping part and an inner part, said doors having apertures, a part of said door pulls recessed in said apertures, and means on said door pulls engageable by the edge of said shelf to push said door pulls part out of said apertures when said frame is in the vertical position, means connected with said inner part of each door pull for limiting the inward movement of said door pulls when said frame is in the horizontal position at which the outer surface of said handle parts of said door pulls are flush with the surface of said doors.

2. In a combination cabinet and table, a cabinet structure having an opening, a frame in said opening, means near the upper end of said frame hingedly securing said frame to said cabinet structure so that said frame is swingable between a vertical position occupying said opening to a horizontal position protruding laterally from the cabinet structure, a pair of doors hinged to said frame and adapted to open and close for entrance into the cabinet when the frame is in the vertical position, said doors constituting a table top when said frame is in the horizontal position, a pair of legs connected with said frame and remote from said hinge means, door pulls connected with said doors and including a hand grasping part and an inner part, said doors having apertures, means connected with said inner part of each door pull for limiting the inward movement of said door pulls when said frame is in the horizontal position at which the outer surface of said handle parts of said door pulls are flush with the surface of said doors, a portion of said frame structure located in the path of movement of said inner parts of said door pulls when said frame is swung from the horizontal back to the vertical position whereby said inner parts of said door pulls are struck by said part of said cabinet structure and said door pulls are projected outwardly from the front faces of the doors so that the hand gripping parts of the door pulls are accessible.

3. In a combination cabinet and table, a cabinet structure having an opening, a frame in said opening, means near the upper end of said frame hingedly securing said frame to said cabinet structure so that said frame is swingable between a vertical position occupying said opening to a horizontal position protruding laterally from the cabinet structure, a pair of doors hinged to said frame and adapted to open and close for entrance into the cabinet when the frame is in the vertical position, said doors constituting a table top when said frame is in the horizontal position, a pair of legs connected with said frame and remote from said hinge means, door pulls connected with said doors and including a hand grasping part and an inner part, said doors having apertures, means connected with said inner part of each door pull for limiting the inward movement of said door pulls when said frame is in the horizontal position at which the outer surface of said handle parts of said door pulls are flush with the surface of said doors, a portion of said frame structure located in the path of movement of said inner parts of said door pulls when said frame is swung from the horizontal back to the vertical position whereby said inner parts of said door pulls are struck by said part of said cabinet structure and said door pulls are projected outwardly from the front faces of the doors so that the hand gripping parts of the door pulls are accessible, a latch operatively connected with said frame and said cabinet structure to hold said frame in a vertical position, and a handle attached to said frame by which to swing said frame from the vertical to the horizontal position.

4. The combination of claim 2, wherein there are folding linkages operatively connected with said legs to hold said legs in the extended position, and said legs being foldable to a retracted position which is essentially coplanar with said frame.

References Cited in the file of this patent

UNITED STATES PATENTS

| | | |
|---|---|---|
| 337,412 | Long | Mar. 9, 1886 |
| 1,195,964 | Bradley | Aug. 26, 1916 |
| 1,453,736 | Wagner | May 1, 1923 |
| 2,130,556 | Miller | Sept. 20, 1938 |
| 2,440,131 | Wayne | Apr. 20, 1948 |
| 2,571,626 | Shellman | Oct. 16, 1951 |

FOREIGN PATENTS

| | | |
|---|---|---|
| 711,081 | Great Britain | June 23, 1954 |